United States Patent [19]

Yeh et al.

[11] Patent Number: 4,574,839

[45] Date of Patent: Mar. 11, 1986

[54] DIRECTIONAL CONTROL VALVE WITH INTEGRAL FLOW CONTROL VALVE

[75] Inventors: Rudolph E. Yeh, Elmhurst; Joseph L. Zagotta, Orland Park, both of Ill.

[73] Assignee: J. I. Case Company, Racine, Wis.

[21] Appl. No.: 601,780

[22] Filed: Apr. 19, 1984

[51] Int. Cl.[4] .............................................. F16K 17/50

[52] U.S. Cl. ............................ 137/614.16; 137/484.6; 137/509; 137/538; 137/614.2

[58] Field of Search .................. 137/484.4, 484.6, 501, 137/504, 508, 509, 538, 599.2, 614.16, 614.17, 614.2

[56] References Cited

U.S. PATENT DOCUMENTS

| | | | |
|---|---|---|---|
| 2,776,056 | 1/1957 | Douglas | 137/504 X |
| 2,881,794 | 4/1959 | Baldwin et al. . | |
| 2,915,084 | 12/1959 | Taylor et al. . | |
| 2,973,778 | 3/1961 | Baker . | |
| 3,016,046 | 1/1962 | Bachofen | 137/484.4 X |
| 3,223,115 | 12/1965 | Kates | 137/501 |
| 3,285,282 | 11/1966 | Martin | 137/504 X |
| 3,333,599 | 8/1967 | Baker . | |
| 3,366,138 | 1/1968 | Graham | 137/538 |
| 3,401,521 | 9/1968 | Plate . | |
| 3,468,341 | 9/1969 | Newcomb et al. | 137/625.3 |
| 3,590,861 | 7/1971 | Chittenden . | |
| 3,595,271 | 7/1971 | Nelson . | |
| 3,643,685 | 2/1972 | Hays . | |
| 3,698,434 | 10/1972 | Nelson . | |
| 3,724,494 | 4/1973 | Alber | 137/501 |
| 3,770,007 | 11/1973 | Orth et al. . | |
| 4,406,442 | 9/1983 | Bettin et al. . | |
| 4,440,191 | 4/1984 | Hansen | 137/501 X |

FOREIGN PATENT DOCUMENTS

| | | | |
|---|---|---|---|
| 2317042 | 12/1973 | Fed. Rep. of Germany | 137/503 |
| 798753 | 1/1981 | U.S.S.R. | 137/508 |

*Primary Examiner*—A. Michael Chambers
*Assistant Examiner*—John C. Fox
*Attorney, Agent, or Firm*—Cullen, Sloman, Cantor, Grauer, Scott & Rutherford

[57] ABSTRACT

The present invention is a pressure compensated directional control valve. The present invention allows the flow rate to a given hydraulic implement to be constant regardless of the load imposed upon the hydraulic implement or the hydraulic pressure supplied by the hydraulic pump. Pressure compensation is achieved by a piston mounted within a sleeve valve insert wherein the piston moves to create a variable orifice to control the amount of hydraulic fluid supplied to the hydraulic implement. The desired flow rate is maintained regardless of changes in the supply pressure and the implement load pressure. The present invention eliminates the need for two separate valves for directional flow control and pressure compensation, without increasing the casing size of the flow control auxiliary valve.

14 Claims, 5 Drawing Figures

DIRECTIONAL CONTROL VALVE WITH INTEGRAL FLOW CONTROL VALVE

SUMMARY OF THE INVENTION

The present invention pertains to a pressure compensated directional control valve. Directional control valves are used in controlling the flow to hydraulic implements. In the Agricultural Industry directional control valves are often referred to as auxiliary valves. In the most common construction, directional control valves will have a pair of cylinder supply passages called cylinder ports, and a pair of cylinder exhaust passages called exhaust ports. Generally perpendicular to and intersecting with the cylinder supply and exhaust passages, is a longitudinal bore. Between the separate pairs of cylinder exhaust and supply passages, and also intersecting with the longitudinal bore is a pressurized fluid supply bore for delivery of the hydraulic fluid. Within the longitudinal bore there is provided a valve spool which selectively directs flow from the supply bore to either of the cylinder supply passages. The valve spool also selectively fluidly connects the cylinder supply passages with the cylinder exhaust passages.

It is often desirable to control the rate of raising or lowering by a hydraulic cylinder. Controlling the rate of raising or lowering is especially desirable when involved with farm implements. It is also desirable that the rate of raising or lowering be independent of the load acting upon the implement.

The control of the rate of raising and lowering by a hydraulic cylinder requires controlling the flow rate of the hydraulic fluid supplied to the cylinder. One method of controlling the flow rate of the hydraulic fluid to the cylinder is to provide a directional control valve with a sleeve (sometimes referred to as a cartridge) and an inner sleeve insert. An example of such a valve is illustrated in U.S. Pat. No. 4,406,442 Bettin et al. To regulate cylinder displacement Bettin et al. provides the functions of two separate valves by providing a direction control valve with the flow control valve integrally mounted within the same housing. In Bettin et al an aperture in the sleeve (spool) and in the sleeve insert (sleeve) are selectively brought into alignment to obtain a desired flow rate. The above method achieves desired results when the hydraulic load of an implement (demand pressure of the cylinder) is constant and the pressure of the hydraulic fluid supplied to the control valve pump is constant. However, usually the load on the controlled cylinder is not constant but varies with the position of the implement. The load also varies with different operations. The pressure of supply will vary due to the flow demand of various other hydraulic systems which are connected to the hydraulic pump, such as the draft control and other hydraulic cylinders. The supply pressure will also vary due to variations in pump performance. With the Bettin et al. directional flow control (rotary) valve, the flow rate which is determined by the pressure differential between pump (supply) pressure and demand (cylinder) pressure, varies as the pressures vary. The result is that controlling the rate of implement raising and lowering requires constant adjustment.

Plate U.S. Pat. No. 3,401,521 is a directional control valve with a flow control valve (60). The flow control valve provides pressure compensated control. However, Plate requires the probe 7 to be axially moved. Plate is not easily adaptable for agricultural tractors since the movement of the probe can often require a large number of turns to set the flow rate. Since directional control valves are often mounted away from vehicle cab areas it is desirable that the flow rate be set with minimum displacement of the valve selector. Minimum displacement allows to flow rate to be selected by lever means from the cab in lieu of an operator being required to dismount from the vehicle.

To overcome the disadvantages of the prior directional control valve the present invention is brought forth. The present invention provides means for controlling the flow rate of the hydraulic fluid delivered to the cylinder regardless of a cylinder load or of the pressure of the hydraulic fluid supplied to the valve (referred to as pump supply pressure). The present invention provides a pressure compensator within the fluid supply bore of the directional control valve. The pressure compensator creates a variable orifice which enlarges or contracts to maintain the differential between the pump supply pressure and the demand pressure at a constant level. The addition of the pressure compensator does not significantly impact valve casing size or configuration. An embodiment of the present invention provides a large degree of selectability with minimum selector displacement, thereby allowing lever means within the vehicle cab to set the flow rate. The above described feature allows the vehicle operator to remain in the cab in lieu of getting out to set the flow rate.

An embodiment of the present invention also provides a check valve which prevents excessive cylinder pressure from flowing in reverse towards the pump. The present invention provides a check valve wherein the cylinder pressure aids in sealing of the check valve.

It is an object of the present invention to provide a directional flow control valve wherein the flow rate of the hydraulic fluid delivered to a cylinder may be set at a predetermined level. It is an object of the present invention to provide a directional control valve wherein the preset flow rate will be maintained at a constant level regardless of fluctuation in pump pressure. It is an object of the present invention to provide a directional flow control valve wherein the preset flow rate will be maintained at a constant level regardless of the demand load. It is an object of the present invention to provide pressure compensation to a directional control valve, without the use of bellows or diaphrams. It is an object of the present invention to provide a directional control valve with pressure compensation without significant changes in configuration or size of its casing. It is an object of the present invention to provide a directional flow control valve wherein the flow rate may be selected by rotating a handle which is mounted in the valve housing. It is an object of the present invention to provide a directional flow control valve wherein the flow rate may be selected by axially displacing a handle which is mounted in the valve housing.

It is a desire of the present invention to provide a directional control valve with a check valve to prevent back flow from a hydraulic cylinder to a pump. It is also a desire of the present invention to provide a directional control valve with a check valve which utilizes the cylinder fluid pressure to aid in seating of the check valve. It is a desire of the present invention to provide a pressure compensated directional control valve with a check valve in a casing which is not significantly enlarged.

It is a desire of an embodiment of the present invention to provide a directional flow control valve with integral pressure compensated flow control valve wherein the displacement to select the desired flow rate is less than previously required of such valves.

Other objects, desires and advantages of the present invention will become apparent to those skilled in the art as the nature of the invention is better understood from the accompanying drawings and the detailed description.

DETAIL DESCRIPTION OF THE DRAWINGS

Figure 1:
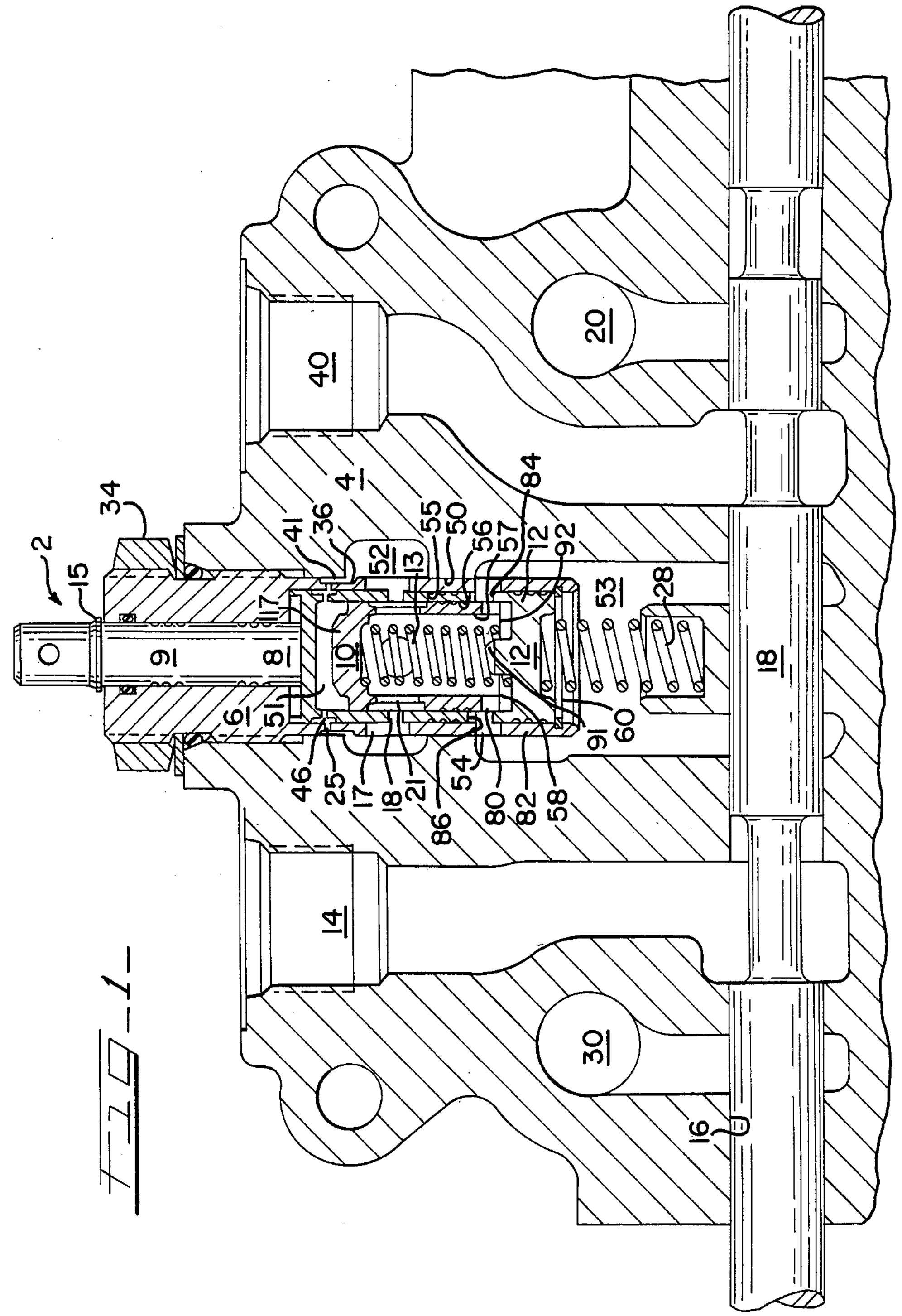
FIG. 1 is a partial view in section of the directional control valve of the present invention.

FIG. 1 illustrates a partial view of an embodiment of a directional control valve 2 of the present invention in section. The directional control valve 2 of the present invention is comprised of six major elements, housing 4, spool valve 18, sleeve 6 (sometimes referred to as a cartridge), sleeve valve insert 8 (sometimes referred to as a rotor), piston 10, and piston valve seat means 12.

The housing is comprised of a plurality of bores, chambers and passages. Passages 40 and 14 are provided as the first and second cylinder supply passages respectively. Passages 20 and 30 are provided as the first and second cylinder exhaust passages respectively. Spool valve 18 is slideably mounted within the longitudinal bore 16 to provide selective fluid communication between the pump and the cylinders. Spool valve 18 also selectively connects the cylinder supply passages with the respective exhaust passage when required.

Housing 4 also has a pressurized fluid supply bore 50. Intersecting with and in some instances coterminous with the pressurized fluid supply bore 50 are three annular chambers, first chamber 41, second chamber 52 and third chamber 53. The housing 4 also has a fluid supply passage (not shown) intersecting with the second chamber 52 for delivering pressurized hydraulic fluid to the longitudinal bore 16 via, second chamber 52, pressurized fluid supply bore 50 and third chamber 53.

Sleeve 6 is mounted within the fluid pressurized fluid supply bore 50. The sleeve is substantially U-shaped having a generally axial bore 55. As illustrated in FIG. 1 an annular landing 36 on the outside diameter of sleeve 6 forms first the chamber 41. The sleeve is locked into the housing 4 by a lock nut 34. The sleeve has at least one first radial orifice 25 which intersects with the first chamber 41. The embodiment illustrated in FIG. 1 has a plurality of geometrically spaced first radial orifices 25. The sleeve will also have at least one second radial orifice 17 intersecting with the second chamber 52. Although the present invention may be utilized with only one second radial orifice 17, to aid in elimination of undesirable side forces on the sleeve valve insert 8 there will usually be a plurality of geometrically spaced second radial orifices 17. The first and second radial orifices 25, 17 are generally spaced axially apart from one another. The embodiment illustrated in FIG. 1 also has geometrically spaced third radial orifices 54 which are generally axially spaced apart from the first and second radial orifices 25 and 17. However, the present invention is not limited to embodiments utilizing a third radial orifice. The first, second and third sleeve radial orifices 17, 25, 54 need not be drilled holes but may also be slots in the circumference of the sleeve valve insert.

Rotatably mounted within the sleeve axial bore 55 is the sleeve valve insert 8. Sleeve valve insert 8 is generally U-shape with a handle portion (or selector) 9 which extends outside of the pressurized fluid supply bore 50. Clip ring 15 limits the sleeve valve insert's 8 axial movement within the sleeve 6. Sleeve valve insert 8 has a plurality of geometrically spaced first and second radial orifices 46 and 18 respectively. The first and second sleeve valve insert radial orifices (46,18) are generally spaced axially apart. The first and second sleeve valve insert radial orifices (46,18) are capable of being placed in selective alignment with the sleeve first and second radial orifices 25, 17 respectively by rotation of the sleeve valve insert handle 9. Only one first 46 and second 18 sleeve valve insert radial orifices are required, however, it is preferable to have a plurality of geometrically spaced orifices for the same reasons as mentioned previously for the sleeve. As previously mentioned for the sleeve, the radial orifices of the sleeve valve insert may be drilled holes or slots on the circumference. Sleeve valve insert 8 also is provided with an axial bore 56.

Slideably mounted in the axial bore 56 of the sleeve valve insert axial bore 56 is the piston 10. Piston 10 is generally shaped like a U and has a head portion 117. Between the piston head 117 and the sleeve valve insert 8, there is defined a variable control volume fourth chamber 51. Fourth chamber 51 has fluid communication with the sleeve valve first radial orifice 46. Piston 10 has a plurality of geometrically spaced second radial orifices 21 which can align with the sleeve valve insert second radial orifices 18. The piston is provided with an axial bore 57 which intersects with the second radial orifices 21. The present invention only requires one second radial orifice 21 for the piston, however, it is often preferable to have a plurality of geometrically spaced second radial orifices 21.

Piston metering surface 58 and piston valve seat means 12 form a variable orifice 80 between the piston axial bore 57 and the third chamber 53. As illustrated in FIG. 1, the metering surface 58 is comprised of the piston cylindrical base 92 and the notch surfaces 91. Notch surfaces 91 are provided to retard rapid movement of the piston 10 towards or away from the valve seat means 12, thereby providing for more stable valve operation. A plurality of geometrically spaced notches are usually more advantageous than a single notch.

Valve seat means 12 is located in the third chamber 53 and is generally axially aligned with the piston metering surface 58. When the piston 10 moves towards valve seat means 12, the variable orifice 80 between the piston axial bore 57 and the third chamber 53 is restricted.

When the piston 10 moves away from the piston valve seat means 12, the variable orifice 80 becomes less restricted. Captured between the piston 10 and the piston valve seat means 12 is a piston biasing means, coil spring 13. Coil spring 13 biases the piston towards the fourth chamber 51 and away from the piston valve seat 12.

It is often desirable to provide a means to prevent a hydraulic load from falling due to a hydraulic pump failure. It is also desirable to prevent reverse flow in the directional control valve 2 due to unexpected excessive loading on the implement powered by the cylinder. To accomplish the above in the embodiment illustrated in FIG. 1 the piston valve seat means 12 is mounted within an extension 82 of the sleeve 6. Valve seat 12 functions as a check valve to prevent fluid communication from the cylinder via the longitudinal bore 16 and the third chamber 53 in a direction towards the piston axial bore 57. The piston valve seat means 12 is capable of axial movement towards the piston 10 and has a check valve biasing means to urge the piston valve seat means towards the piston. The check valve biasing means, coil spring 28 is located within the third chamber 53. Sleeve lip 60, limits the axial displacement of the valve seat means 12 away from the piston 10. By fitting the piston valve seat means 12 within extension 82, the check valve can be added to the directional control valve 2 without significantly enlarging the housing 4.

In operation the desired rate of lift of the hydraulic cylinder is effectuated by the rotation of handle 9 of the sleeve valve insert 8. Rotation of handle 9 causes the sleeve valve insert second radial orifice 18 to be brought into selective alignment with the sleeve second radial orifice 17. The alignment between the second radial orifices 17 and 18 of the sleeve valve and sleeve valve insert will define the setting of the fixed orifice. The amount of rotation required may be designed for less than one complete rotation to cover the full range of valve flow rate selection.

When fluid is not being supplied to the cylinder, the pressure in first chamber 41 will equal the pressure in second and third chambers 52 and 53. Upon movement of the spool valve 18 allowing fluid to flow into one of the cylinder supply passages 14 or 40, the pressure in third chamber 53 will take on the pressure caused by the load of the implement which is controlled by the hydraulic cylinder. Since there is essentially no flow through fourth chamber 51, the pressure in the first 41 and fourth 51 chambers will be equal to that of the pressure supplied by the hydraulic pump. The pressure inside piston axial bore 57 of the second chamber will become intermediate the pressures in the fourth chamber 51 and third chamber 53. As the hydraulic fluid flows through the second radial orifices 17 and 18 into the piston axial bore 57, there will be a pressure drop down to the level of the pressure within the hydraulic cylinder or as previously mentioned the pressure in the third chamber 53. The flow rate is determined by the fixed orifice of the second radial orifices 17 and 18 and the pressure differential over the fixed orifice.

The pressure differential over the fixed orifice will generate a downward force equal to the pressure differential multiplied by piston area. The downward force on the piston 10 is balanced by the preset force in spring 13. Therefore, due to the action of piston 10, the pressure differential will remain fairly constant regardless of fluctuations in pump pressure or demand pressure.

Figure 3:
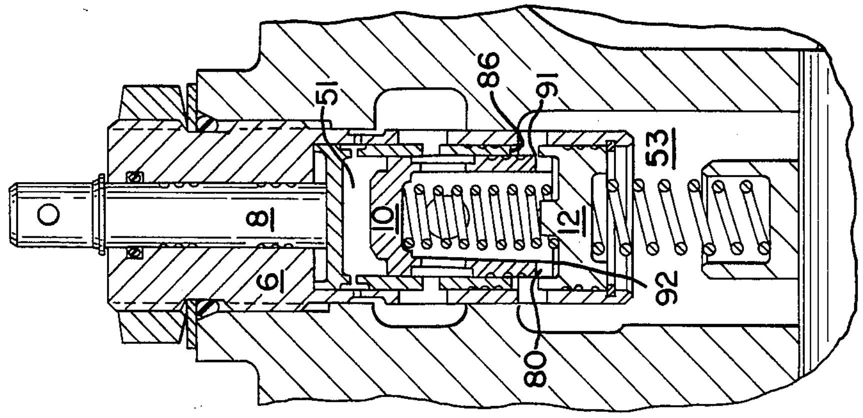
FIG. 3 is a detailed enlargement of a portion of the directional control valve of FIG. 1 illustrating operation of the pressure compensator when the variable orifice has contracted to maintain constant flow.
Figure 2:
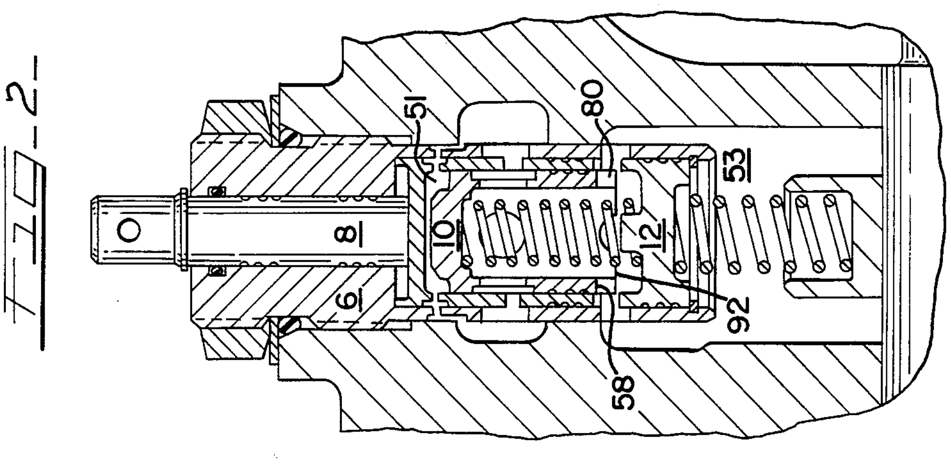
FIG. 2 is a detailed enlargement of a portion of the directional control valve of FIG. 1 illustrating operation of the pressure compensator when the variable orifice is enlarged to maintain constant flow.

FIG. 2 illustrates the effect of an increase in the demand pressure. The piston 10 moves axially in response to the increased demand pressure by being axially displaced towards the fourth chamber 51. Metering surface 58 moves away from the valve seal means 12, thereby increasing the variable orifice 80 and maintaining the preselected flow rate. FIG. 3 illustrates the opposite occurrence of a decrease in demand pressure. The piston 10 is forced downward causing the variable orifice 80 to contract thereby maintaining a constant flow rate.

The piston valve seat means 12 also acts as a check valve. When the demand pressure exceeds the pump pressure the valve seat means is forced upward to prevent flow from third chamber 53 to the piston axial bore 57. To seal off piston axial bore 57, piston valve seat means sealing surface 84 is capable of making sealing contact with check valve seat means 86 provided by the surface of piston valve insert 8 most adjacent to variable orifice 80. With the check valve of the present invention, the fluid pressure of the cylinder tends to seat the valve. Seating force is not totally dependent upon coil spring 28. Coil spring 28 adds additional force in seating valve seat means 12 against check valve seat means 86. It will be apparent to those skilled in the art of the various modifications in the design of the check valve seat means 12 that can be made to determine the sealing surface and also that various surfaces of the valve sleeve 6, sleeve valve insert 8 or piston 10 may be utilized as the check valve seat means.

Figure 4:
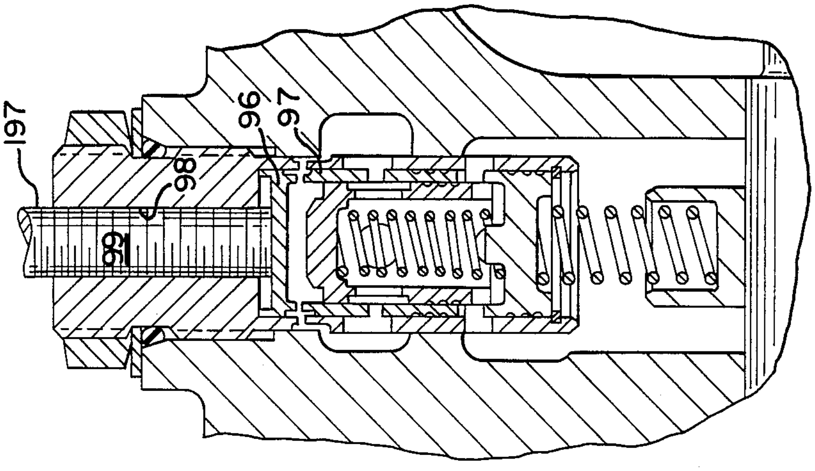
FIG. 4 illustrates a detailed enlargement of a portion of an alternative embodiment of the present invention wherein the desired flow rate is achieved by axial movement of the sleeve valve insert.

FIG. 4 illustrates an emobidment of the present invention 197 wherein the flow rate is set by axially moving the sleeve valve insert relative to the sleeve. The sleeve valve handle 99 is threadably inserted into the threaded bore 98 of the sleeve 97, wherein rotation of the handle will cause the sleeve valve insert 96 to axially displace with respect to the sleeve. The above threaded arrangement acts as a detent to maintain the fixed orifice between the second orifices at the desired flow setting.

If desired the sleeve valve insert may be designed to displace axially without rotation. In such an embodiment as above, standard mechanical or hydraulic detent mechanism may be utilized to maintain a selected axial displacement. In such designs as described above, the sleeve, sleeve valve insert and piston need not have a circular cross section since there is no requirement of rotation of the sleeve valve insert.

Figure 5:
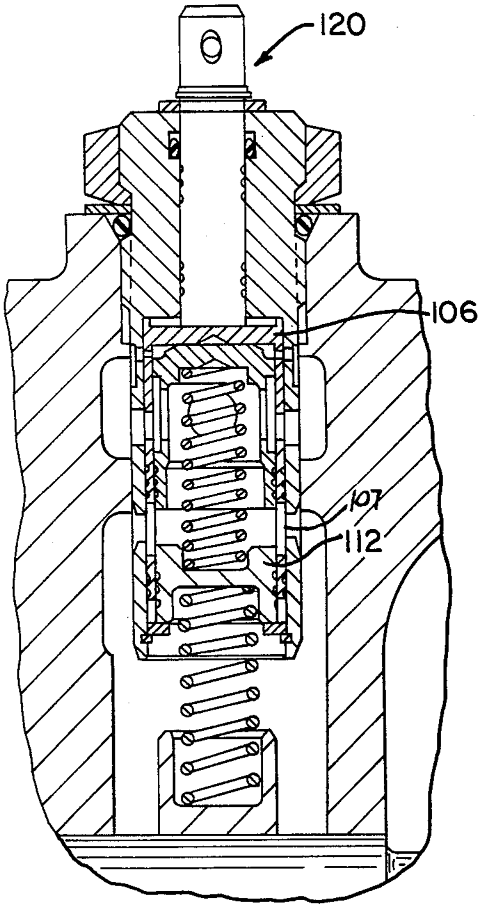
FIG. 5 illustrates a detailed enlargement of a portion of an alternative embodiment of the present invention with an extended sleeve valve insert.

FIG. 5 illustrates an alternative embodiment 120 of the present invention wherein the sleeve valve insert 106 has an extension which is provided with a plurality of third radial orifices 107. The valve seat means 112 is slideably mounted within the sleeve valve insert.

It will be apparent to those skilled in the art that the sleeve may be integrally connected to the housing, or the sleeve may be deleted, however, most applications will find it preferable from a manufacturing aspect to have a sleeve separate from the housing and insertable.

While a few embodiments of the present invention have been explained, it will be readily apparent to those skilled in the art of the various modifications which can be made to the present invention without departing from the spirit and scope of this application as encompassed by the following claims.

What is claimed is:

1. A directional flow control valve with pressure compensation comprising:

a housing including a first longitudinal bore, first and second cylinder supply and exhaust passages intersecting with said longitudinal bore, a first chamber intersecting with a second chamber, a third chamber, and a pressurized fluid supply bore intersecting with said first, second and third chambers;

a valve spool slideably mounted within said longitudinal bore for selective fluid communication between said third chamber and said cylinder supply passages;

sleeve means mounted within said pressurized fluid supply bore, said sleeve having at least one first radial orifice intersecting with said first chamber, and at least one second radial orifice intersecting with said second chamber, and wherein said first and second radial orifices being generally spaced axially apart from one another;

a sleeve valve insert mounted within said sleeve, said sleeve valve insert having a generally axial bore, and said sleeve valve insert having at least one first radial orifice and at least one second radial orifice, said sleeve valve insert second radial orifice being capable of being placed in selective alignment with said sleeve second radial orifice by displacement of said sleeve valve insert within said sleeve;

a piston mounted within said sleeve valve insert having a first radial orifice and an axial bore intersecting with said piston first radial orifice providing fluid communication between said second chamber and said third chamber, and wherein said piston being capable of axial movement in response to the pressure levels within said sleeve valve insert and said third chamber;

a piston valve seat means located within said third chamber, said piston valve seat means and said piston forming a variable orifice between said piston axial bore and said third chamber;

said second chamber comprising an annular groove in said housing surrounding said fluid pressurized fluid supply bore, and wherein said sleeve has an outside diameter and wherein said first chamber comprises an annular landing on the outside diameter of said sleeve, said annular landing intersecting with said second chamber;

piston biasing means biasing said piston away from said piston valve seat.

2. An apparatus as recited in claim 1, wherein said sleeve valve insert is rotated for displacement of said sleeve valve insert within said sleeve.

3. An apparatus as recited in claim 2, provided with detent means for fixing the axial displacement of said sleeve valve insert relative to said sleeve.

4. An apparatus as recited in claim 3, wherein said detent means comprises a sleeve valve insert handle threadably inserted within a threaded bore in said housing.

5. An apparatus as recited in claim 1, wherein said sleeve valve insert is axially moved for displacement of said sleeve valve insert within said sleeve.

6. An apparatus as recited in claim 1, wherein there is a check valve in said third chamber, said check valve preventing fluid communication in a direction from said longitudinal bore to said second chamber.

7. An apparatus as recited in claim 6, wherein said check valve comprises said piston valve seat means moving axially towards said piston to make contact with check valve seat means located in said third chamber.

8. An apparatus as recited in claim 7, wherein said piston valve seat means is slideably mounted within said sleeve and wherein said piston valve seat means is spring biased towards said piston.

9. An apparatus as recited in claim 8, wherein said sleeve has an inner lip along its inner diameter, said inner lip limiting the axial movement of said piston valve seat means away from said piston.

10. An apparatus as recited in claim 1 wherein said piston biasing means is a first coil spring captured between said piston and said piston valve seat means.

11. An apparatus as recited in claim 1, wherein said piston has a metering surface with notches adjacent said piston valve seat means.

12. An apparatus as recited in claim 1, wherein said sleeve and said sleeve valve insert have a plurality of geometrically spaced first and second radial orifices and said piston has a plurality of first radial orifices.

13. A directional flow control valve with pressure compensation comprising:

a housing including a first longitudinal bore, first and second cylinder supply and exhaust passages intersecting with said longitudinal bore, a first chamber intersecting with a second chamber, a third chamber, and a pressurized fluid supply bore intersecting with said first, second and third chambers;

a valve spool slideably mounted within said longitudinal bore for selective fluid communication between said third chamber and said cylinder supply passages;

sleeve means mounted within said pressurized fluid supply bore, said sleeve having at least one first radial orifice intersecting with said first chamber, and a plurality of geometrically spaced second radial orifices intersecting with said second chamber, and wherein said first and second radial orifices being generally spaced axially apart from one another;

a sleeve valve insert mounted within said sleeve, said sleeve valve insert having a generally axial bore, and said sleeve valve insert having at least one first radial orifice and a plurality of geometrically spaced second radial orifices, said sleeve valve insert second radial orifices being capable of being placed in selective alignment with said second radial orifices by displacement of said sleeve valve insert within said sleeve;

a piston mounted within said sleeve valve insert having a plurality of geometrically spaced first radial orifices, said piston also having an axial bore intersecting with said first radial orifices providing fluid communication between said second chamber and said third chamber, and wherein said piston being capable of axial movement in response to the pressure levels within said sleeve valve insert and said third chamber;

a piston valve seat means located within said third chamber generally axial aligned with said piston, capable of axial movement towards said piston, and said piston valve seat means and said piston forming a variable orifice between said piston axial bore and said third chamber;

a first coil spring captured between said piston and said piston valve seat means biasing said piston away from said piston valve seat; and a second coil spring located in said third chamber biasing said piston valve seat means towards said piston; and check valve means located in said third chamber comprising said piston valve seat means and preventing fluid from said longitudinal bore to said second member.

14. A directional flow control valve with pressure compensation comprising:

a housing including a first longitudinal bore, first and second cylinder supply and exhaust passages intersecting with said longitudinal bore, a first chamber intersecting with a second chamber, a third chamber, and a pressurized fluid supply bore intersecting with said first, second and third chambers;

a valve spool slideably mounted within said longitudinal bore for selective fluid communication between said third chamber and said cylinder supply passages;

sleeve means mounted within said pressurized fluid supply bore, said sleeve having at least one first radial orifice intersecting with said first chamber, and a plurality of geometrically spaced second radial orifices intersecting with said second chamber and a plurality of third radial orifices intersecting with said third chamber, and wherein said first and second radial orifices and said third radial slots being generally spaced axially apart from one another;

a sleeve valve insert mounted within said sleeve, said sleeve valve insert having a generally axial bore, and said sleeve valve insert having a plurality of geometrically spaced first, second, and third radial orifices, said sleeve valve insert second radial orifices being capable of being placed in selective alignment with said sleeve second radial orifices by rotation of said sleeve valve insert within said sleeve;

a piston mounted within said sleeve valve insert having geometrically spaced first radial orifices, said piston also having an axial bore intersecting with said second radial orifices providing fluid communication between said second chamber and said third chamber, and wherein said piston being capable of axial movement in response to the pressure levels within said sleeve valve insert and said third chamber;

a piston valve seat means mounted within said sleeve valve insert generally axially aligned with said piston, capable of axial movement towards said piston and said piston valve seat means and said piston forming a variable orifice between said piston axial bore and said third chamber;

a first coil spring captured between said piston and said piston valve seat means biasing said piston away from said piston valve seat;

a second coil spring located in said third chamber biasing said piston valve seat means towards said piston; and check valve means located in said third chamber comprising said piston valve seat means and preventing fluid flow from said longitudinal bore to said second member.

* * * * *